United States Patent Office 2,701,260
Patented Feb. 1, 1955

2,701,260
PRODUCTION OF UNSATURATED NITRILES BY SELECTIVE OXIDATION

Hugh J. Hagemeyer, Jr., Kingsport, Tenn., assignor to Eastman Kodak Company, Rochester, N. Y., a corporation of New Jersey No Drawing. Application October 19, 1950,
Serial No. 191,072

4 Claims. (Cl. 260—465.9)

This invention relates to a process for the production of unsaturated nitriles. More particularly, this invention concerns a process of producing unsaturated nitriles, exemplified by acrylonitrile and methacrylonitrile, by the selective oxidation of the corresponding saturated nitriles, such as propionitrile and isobutyronitrile.

It is known in the art to produce saturated nitriles by various methods such as by the reaction of an aliphatic acid with ammonia. It has also been proposed in the art to convert saturated nitriles to unsaturated nitriles by dehydrogenation over a dehydrogenation catalyst. That is, the saturated nitrile is passed in contact with dehydrogenation catalysts exemplified by oxides of platinum and palladium carried on suitable supports and at an elevated temperature. However, certain of such prior art processes involving dehydrogenation have not been too satisfactory for various reasons. For example, the yields may be rather low in such processes. Also there is a tendency for the dehydrogenation catalysts to become deactivated by the deposition of carbon thereon.

Inasmuch as there is considerable commercial demand and use of unsaturated nitriles, exemplified by acrylonitrile and the like, it is apparent that the provision of an improved process whereby saturated nitriles may be more readily and efficiently converted to unsaturated nitriles is a highly desirable result.

After extensive investigation, I have found a new method utilizing selective oxidation whereby saturated nitriles may be quickly and efficiently converted to unsaturated nitriles as will be set forth in detail hereinafter.

This invention has for one object to provide a new method of converting saturated nitriles to unsaturated nitriles. Another object is to provide a method for converting saturated nitriles to unsaturated nitriles by selective oxidation. A still further object is to provide methods of the class just described wherein a screen or gauze type of catalyst may be effectively employed. A particular object of this invention is to provide a method of selective oxidation whereby propionitrile may be converted to acrylonitrile. Another similar object is to provide a method of selective oxidation whereby isobutyronitrile may be converted to methacrylonitrile. Other objects will appear hereinafter.

In the present invention I have found that the lower aliphatic saturated nitriles can be selectively oxidized in good conversions and yields and without deactivating the catalyst by employing an exothermic reaction with oxygen and/or air and oxygen containing gases using metal catalysts such as silver, copper, gold, platinum, palladium, ruthenium and iridium and alloys thereof. The metals are conveniently used in the form of pellets, wire screen, gauze, and/or perforated metal plates. Silver and copper are the preferred catalysts because of cost and in general copper is used where an easily polymerizable unsaturated nitrile is formed. The particular metal catalyst can be painted or coated with small amounts of suitable promoters such as the oxides of alkaline earth metals, and the oxides of tin, antimony, bismuth, titanium, zinc and zirconium.

The reaction is represented by the following equations showing the selective oxidation of propionitrile and isobutyronitrile to acrylonitrile and methacrylonitrile respectively.

(I)
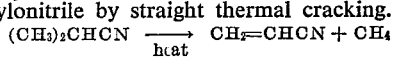
$$2CH_3CH_2CN + O_{2(air)} \xrightarrow[Ag, Cu, Pt, Pd.]{500-800° C.} 2CH_2{=}CHCN + H_2O$$

(II) $2(CH_3)_2CHCN + O_2 \longrightarrow 2CH_2{=}C(CH_3)CN + H_2O$

Some acrylonitrile is also formed in the production of methacrylonitrile by straight thermal cracking.

$$(CH_3)_2CHCN \xrightarrow[heat]{} CH_2{=}CHCN + CH_4$$

A further understanding of my invention will be had from the general description which immediately follows and a consideration of the several specific examples set forth hereinafter.

The saturated nitrile to be reacted is vaporized and preheated to 150–600° C. Air and/or oxygen or oxygen containing gases are mixed with the preheated nitrile feed immediately before or in the catalyst bed and reacted to form the unsaturated nitrile. The reaction is usually carried out at temperatures in the range 500–800° C. and using contact times of 0.001 to 2.0 seconds. The molar ratio of oxygen to nitrile can be varied within wide limits depending on the preheat temperature, contact time and reactor temperature used and the conversion per pass desired.

The reactor temperature can be controlled by regulating the molar ratio of oxygen to nitrile. I have also found it advantageous to use molar quantities of oxygen less than that required to maintain the desired reactor temperature and to apply some external heat.

Although silver, copper, gold, platinum, palladium, ruthenium and iridium and mixtures and alloys thereof can be used in a variety of shapes and forms it is generally preferred to use a close pressed bundle of flat screens. This insures an even distribution of heat throughout the reactor space and helps to avoid local hot spots, catalyst fusion and excessive burning of the nitrile feed. Normal, increased, or decreased pressures may be used.

The invention is illustrated in the following examples:

EXAMPLE 1

The reactor used in this set of runs was a double walled vessel 21 inches long by 1.25 inches O. D. with 0.16 inch clearance between the inner and outer walls. It was piped up so that propionitrile vapors entering at the bottom from the vaporizer passed upward through the outer tube, mixed with air, with or without diluents at the top and then passed downward through the inner tube which contained the catalyst. The nitrile vapors were preheated by exchange in the upward passage through the reactor. Immediately after leaving the reactor the gas stream was rapidly cooled by glycol condensers. Catalysts used, average temperatures in the reaction zone, ratio of propionitrile to gram atoms of oxygen, contact times, conversions, and ultimate yields are reported in the Table I.

Table I

| Run No. | Catalyst | Average Temp. Reactor Zone, °C. | G. M. EtCN/ G. Atom Oxygen | Contact Time | Conv. to AN | Ultimate Yield |
|---|---|---|---|---|---|---|
| 5 | Copper pellets, 631 g | 592 | 1.22 | 0.85 | 5.58 | 54.7 |
| 17 | Copper pellets, 130 g | 616 | 1.98 | 0.046 | 8.25 | 70.3 |
| 20 | Silver Wire, 332 g | 610 | 2.02 | 0.085 | 7.74 | 67.9 |
| 21 | Silver Wire, 212 g | 670 | 2.22 | 0.058 | 10.20 | 77.3 |
| 22* | Copper pellets | 620 | 3.0 | 0.14 | 26.0 (MAN) | 87.0 |

*Isobutyronitrile oxidized to methacrylonitrile (MAN).

EXAMPLE 2

In this series of runs propionitrile was vaporized and passed through a preheater with or without a diluent. Air and/or oxygen containing gases (oxygen plus $CO_2$) were mixed with the nitrile feed in or immediately before reaching the catalyst space. The reaction is exothermic and the temperature in the reactor space was controlled by the throughput, the preheat temperature, and the gram mole ratio of propionitrile to gram atoms of oxygen. The preheater was a vertical tube one inch O. D. by 24 inches long and was topped by a reactor space 1.5 inches O. D. and 6 inches long. The preheater tube is preferably packed with an inert material and catalysts used included silver, copper, platinum, palladium and rhodium and mixtures thereof. Catalysts, average reaction temperatures, nitrile to oxygen ratios, contact times, conversions and ultimate yields are reported in Table II. Table III reports results for the manufacture of methacrylonitrile from isobutyronitrile with byproduct acrylonitrile by this method.

*Table II*

| Run No. | Catalyst | Ave. Temp. Reac. Zone, °C. | Preheat Temp. | EtCN/O | Cont. Time | AN Conv. | Ultimate Yield |
|---|---|---|---|---|---|---|---|
| 62 | 7% Pt, 93% Ag wires | 620 | 280 | 3.44 | 0.49 | 8.21 | 77.1 |
| 63 | 20% Pt, 80% Ag 100 mesh screens. | 670 | 270 | 1.75 | 0.11 | 14.7 | 62.3 |
| 66 | Platinum Screens, 100 mesh. | 460 | 270 | 2.98 | 0.85 | 5.23 | 79.8 |
| 67 | Ag screens 100 mesh | 690 | 290 | 2.01 | 0.060 | 11.4 | 67.0 |
| 69 | Cu Screens, 50 mesh | 670 | 295 | 4.50 | 0.034 | 12.1 | 79.0 |
| 70 | ___do___ | 690 | 340 | 4.50 | 0.063 | 13.7 | 81.0 |
| 72 | 50% Cu, 50% Ag Screens | 690 | 335 | 4.50 | 0.061 | 9.2 | 72.0 |

*Table III*

| Run No. | Catalyst | Temp., °C. Reactor | Temp., °C. Preheat | IBN/O | Cont. Time | Conv. to— | | Percent Ultimate Yield |
| | | | | | | AN | MAN | |
|---|---|---|---|---|---|---|---|---|
| 77 | Copper Screen 100 mesh. | 640 | 300 | 3.2 | 0.46 | 3.1 | 23.7 | 88 |
| 78 | ___do___ | 610 | 280 | 3.0 | 0.07 | 2.2 | 14.1 | 71 |
| 79 | Copper Pellets | 630 | 310 | 2.5 | 0.18 | 2.7 | 18.6 | 82 |
| 80 | Ag Screen, 100 mesh | 640 | 290 | 3.0 | 0.26 | 1.9 | 21.4 | 86 |

In the above tables summarizing a substantial number of runs which were conducted with the various catalysts and on different saturated nitriles with different contact times, etc., the symbol EtCN refers to the saturated nitrile propionitrile. The abbreviation IBN refers to the saturated nitrile isobutyronitrile. Since these saturated nitriles are known chemical compounds, extensive discussion of methods of preparation are unnecessary. The saturated nitrile used in our process may be obtained from any suitable source. However, in the way of example, it is mentioned that EtCN may be prepared by the reaction of propionic acid and ammonia in the presence of a suitable catalyst such as phosphoric acid impregnated aluminum oxide at a temperature between 400–550° C. The propionic acid and ammonia are passed over the catalyst to give propionitrile (CH₃CH₂CN) 

plus water. Likewise, the IBN may be secured from any suitable source as, for example, manufactured by the reaction of isobutyraldehyde and ammonia in the presence of a suitable catalyst such as a supported chromium oxide catalyst. The abbreviations AN and MAN in the above tables refer to acrylonitrile and methacrylonitrile.

It is believed that it may be seen from the foregoing that I have provided a relatively direct and efficient method for converting saturated nitriles to unsaturated nitriles. As may be observed from the data set forth above respecting the several examples operated at different temperatures and at different contact times, etc., that relatively high yields of the order of greater than 80% may be secured. It will be observed that the contact time of the saturated nitrile and oxygen with the catalyst screen is preferably quite short and preferably only comprises a fraction of a minute. That is, contact times which do not exceed ½ minute are preferred. While in Example 1 I have referred to certain reactor construction, this is primarily for the purposes of illustration and my novel process may be carried out in another suitable catalytic reactor. Certain other changes in the present invention will be apparent to those skilled in the art. Hence, I do not wish to be restricted in my invention excepting insofar as it is necessitated by the prior art and the spirit of the appended claims.

I claim:

1. A process of converting a saturated lower aliphatic nitrile to an unsaturated nitrile having the same number of carbon atoms which comprises preheating said saturated nitrile, contacting said saturated nitrile with a noble metal catalyst comprised of a metal from the group consisting of silver, copper, gold, platinum, palladium, ruthenium, and iridium and at a reaction temperature between 300–800° C., said contacting with the catalyst taking place in the presence of oxygen as a primary reactant whereby a substantial portion of the saturated nitrile is oxidized to an unsaturated nitrile.

2. A process for converting a saturated lower aliphatic nitrile having from 3 to 5 carbon atoms to an unsaturated nitrile having the same number of carbon atoms, said process comprising contacting a gaseous mixture of the saturated nitrile and oxygen with a noble metal catalyst selected from the group consisting of silver, copper, gold, platinum, palladium, ruthenium, and iridium at a reaction temperature in the range of 300–800° C., and with a contact time of only a fraction of a minute, the composition of the gaseous mixture of the saturated nitrile and oxygen being within the range of 1.22 gram mols of nitrile per gram atom of oxygen to 4.50 gram mols of nitrile per gram atom of oxygen.

3. A process which comprises contacting a saturated aliphatic nitrile having from 3 to 5 carbon atoms together with a substantial portion of oxygen with a metallic silver screen catalyst maintained at a temperature between 300° C. and 800° C., whereby the saturated nitrile is oxidized to the corresponding unsaturated nitrile.

4. The process which comprises contacting propionitrile and oxygen as primary reactants with a copper screen catalyst at a temperature between 300–800° C. whereby acrylonitrile is formed.

References Cited in the file of this patent

UNITED STATES PATENTS

| 2,384,737 | Haas | Sept. 11, 1945 |
| 2,385,552 | Spence et al. | Sept. 25, 1945 |
| 2,412,437 | Wagner | Dec. 10, 1946 |
| 2,445,693 | Porter et al. | July 20, 1948 |
| 2,452,505 | Teter | Oct. 26, 1948 |
| 2,481,826 | Cosby | Sept. 13, 1949 |
| 2,499,055 | Cosby et al. | Feb. 28, 1950 |
| 2,554,484 | Loder | May 29, 1951 |

FOREIGN PATENTS

| 790,262 | France | Nov. 16, 1935 |

OTHER REFERENCES

Berkman et al.: "Catalysis" (Reinhold), pp. 892, 904 (1940).